United States Patent
Schaeffer et al.

(10) Patent No.: US 8,184,230 B2
(45) Date of Patent: May 22, 2012

(54) HIGH EFFICIENCY BACKLIGHT ASSEMBLY FOR FLAT PANEL DISPLAY ASSEMBLY AND METHOD FOR THE MANUFACTURE THEREOF

(75) Inventors: Martin Schaeffer, Peoria, AZ (US); John Anderson, Phoenix, AZ (US); Stephen J. Pamperin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 379 days.

(21) Appl. No.: 12/437,970

(22) Filed: May 8, 2009

(65) Prior Publication Data
US 2010/0283933 A1    Nov. 11, 2010

(51) Int. Cl.
*G02F 1/1333* (2006.01)
*G02F 1/1335* (2006.01)
(52) U.S. Cl. .......................................... 349/58; 349/71
(58) Field of Classification Search .................. 349/58, 349/61, 71
See application file for complete search history.

(56) References Cited

U.S. PATENT DOCUMENTS

| | | | |
|---|---|---|---|
| 4,772,509 | A | 9/1988 | Komada et al. |
| 5,377,083 | A | 12/1994 | Tada |
| 5,539,623 | A | 7/1996 | Gurz et al. |
| 6,583,444 | B2 | 6/2003 | Fjelstad |
| 7,307,391 | B2 | 12/2007 | Shan |
| 7,431,479 | B2 | 10/2008 | Weaver, Jr. et al. |
| 2005/0045897 | A1 | 3/2005 | Chou et al. |
| 2008/0062701 | A1 | 3/2008 | Harrah et al. |
| 2009/0166653 | A1* | 7/2009 | Weaver et al. ............ 257/98 |

* cited by examiner

*Primary Examiner* — Eric Wong
(74) *Attorney, Agent, or Firm* — Ingrassia Fisher & Lorenz, P.C.

(57) ABSTRACT

A backlight assembly is provided for deployment within a flat panel display assembly. In one embodiment, the backlight assembly includes a printed wiring board (PWB), a casing sidewall, a plurality of light emitting diodes (LEDs), a reflective solder mask, and a first reflective silkscreen layer. The PWB includes a display-facing surface, and the casing sidewall disposed is around a peripheral portion of the PWB and cooperates with the display-facing surface to define a light cavity. The plurality of LEDs us electrically coupled to the PWB and illuminates the light cavity when energized. The reflective solder mask overlays the display-facing surface of the PWB, and the first reflective silkscreen layer overlays the reflective solder mask. The first reflective silkscreen layer cooperates with the reflective solder mask to increase the reflectivity of the light cavity over the visible color spectrum.

10 Claims, 4 Drawing Sheets

HIGH EFFICIENCY BACKLIGHT ASSEMBLY FOR FLAT PANEL DISPLAY ASSEMBLY AND METHOD FOR THE MANUFACTURE THEREOF

TECHNICAL FIELD

The present invention relates generally to display devices and, more particularly, to a high efficiency backlight assembly suitable for deployment within a flat panel display assembly, such as a liquid crystal display assembly.

BACKGROUND

A generalized liquid crystal display (LCD) assembly includes an LCD (e.g., one or more glass substrates carrying a number of electrodes and liquid crystals), which is disposed between a transparent display cover and a backlight assembly. The backlight assembly typically includes a driver board, a casing sidewall, a light source, and a heat sink. The casing sidewall circumscribes the driver board and cooperates therewith to create a light cavity within the LCD assembly. The light source is electrically coupled to the driver board and, when energized, illuminates the light cavity to backlight the LCD. The light source can assume a variety of different forms including that of an incandescent bulb, an electroluminescent panel, a fluorescent lamp, or a plurality of light emitting diodes (LEDs). In the latter case (i.e., when the light source assumes the form of a plurality of LEDs), the backlight assembly may further include a printed wiring board (PWB) having a generally planar leading surface that faces the LCD when the LCD assembly is fully assembled (referred to as "the display-facing surface" herein). The LEDs may be mounted to the display-facing surface of the PWB. The PWB, in turn, may be mounted to the heat sink. In certain LCD assemblies, a diffuser film and/or at least one polarizing film may be disposed between the LCD and the backlight assembly. The diffuser film disburses the LED-produced light evenly over the rear surface of the LCD, and the polarizing film reflects light that is not oriented in the same manner as the LCD's polarizing filters.

The efficiency of a backlight assembly, and specifically the brightness of the light produced by backlight assembly relative to the power required to drive the backlight assembly, has a significant impact on the overall efficiency of the host LCD assembly. It is consequently desirable to optimize the efficiency of a backlight assembly, especially when the backlight assembly is included within an LCD assembly deployed aboard an aircraft wherein available energy may be in high demand and relatively costly to generate. The efficiency of a backlight assembly is determined, in part, by the reflectivity of the light cavity, and particularly the reflectivity of the PWB's display-facing surface, which reflects the light emitted from the LEDs toward the LCD and which also re-reflects light returned by the polarizing film. To this end, certain thermoplastic resin coatings (e.g., polytetrafluoroethylene-based coatings) have been developed that may be applied over the display-facing surface of the PWB to increase the reflectivity of the display-facing surface and, therefore, the overall reflectivity of the light cavity. Although providing a considerable increase in the reflectivity of the display-facing surface, such known thermoplastic resin coatings tend to be relatively expensive to produce and can add considerable cost in large scale manufacturing.

There thus exists an ongoing need to provide a high efficiency backlight assembly suitable for deployment within an LCD assembly or other flat panel display assembly. Ideally, such a high efficiency backlight assembly would include a highly efficient light cavity that is relatively inexpensive and straightforward to produce. It would be desirable if such a highly efficient light cavity included an optical coating overlaying the display-facing surface of the PWB that is highly reflective to visible light and that reflects light substantially evenly over the visible color spectrum. It would also be desirable to provide a method for fabricating such a high efficiency backlight assembly that fits within standard manufacturing processes and can be automated with relative ease. Other desirable features and characteristics of the present invention will become apparent from the subsequent Detailed Description and the appended Claims, taken in conjunction with the accompanying Drawings and this Background.

BRIEF SUMMARY

A backlight assembly is provided for deployment within a flat panel display assembly. In one embodiment, the backlight assembly includes a printed wiring board (PWB), a casing sidewall, a plurality of light emitting diodes (LEDs), a reflective solder mask, and a first reflective silkscreen layer. The PWB includes a display-facing surface, and the casing sidewall disposed is around a peripheral portion of the PWB and cooperates with the display-facing surface to define a light cavity. The plurality of LEDs is electrically coupled to the PWB and illuminates the light cavity when energized. The reflective solder mask overlays the display-facing surface of the PWB, and the first reflective silkscreen layer overlays the reflective solder mask. The first white silkscreen layer cooperates with the reflective solder mask to increase the reflectivity of the light cavity over the visible color spectrum.

A method is also provided for manufacturing a backlight assembly suitable for deployment within a flat panel display assembly. In one embodiment, the method includes the steps of: (i) fabricating a printed wiring board (PWB) having a display-facing surface, (ii) disposing a casing sidewall around the PWB to create light cavity within the backlight assembly, (iii) electrically coupling a plurality of light emitting diodes (LEDs) to the PWB, (iv) depositing a reflective solder mask over the display-facing surface of the PWB, and (v) applying a first reflective silkscreen layer over the reflective solder mask utilizing a silkscreen process. The first reflective silkscreen layer cooperates with the reflective solder mask to increase the reflectivity of the light cavity over the visible color spectrum.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Although the following describes an exemplary embodiment of a highly reflective backlight assembly deployed within a liquid crystal display (LCD) assembly, it will be appreciated that embodiments of the highly reflective backlight assembly are suitable for employment within various types of flat panel display assemblies requiring rear or side illumination. Such flat panel display assemblies include, but are not limited to, plasma-based display assemblies and organic light-emitting diode (OLED) display assemblies.

Figure 1:
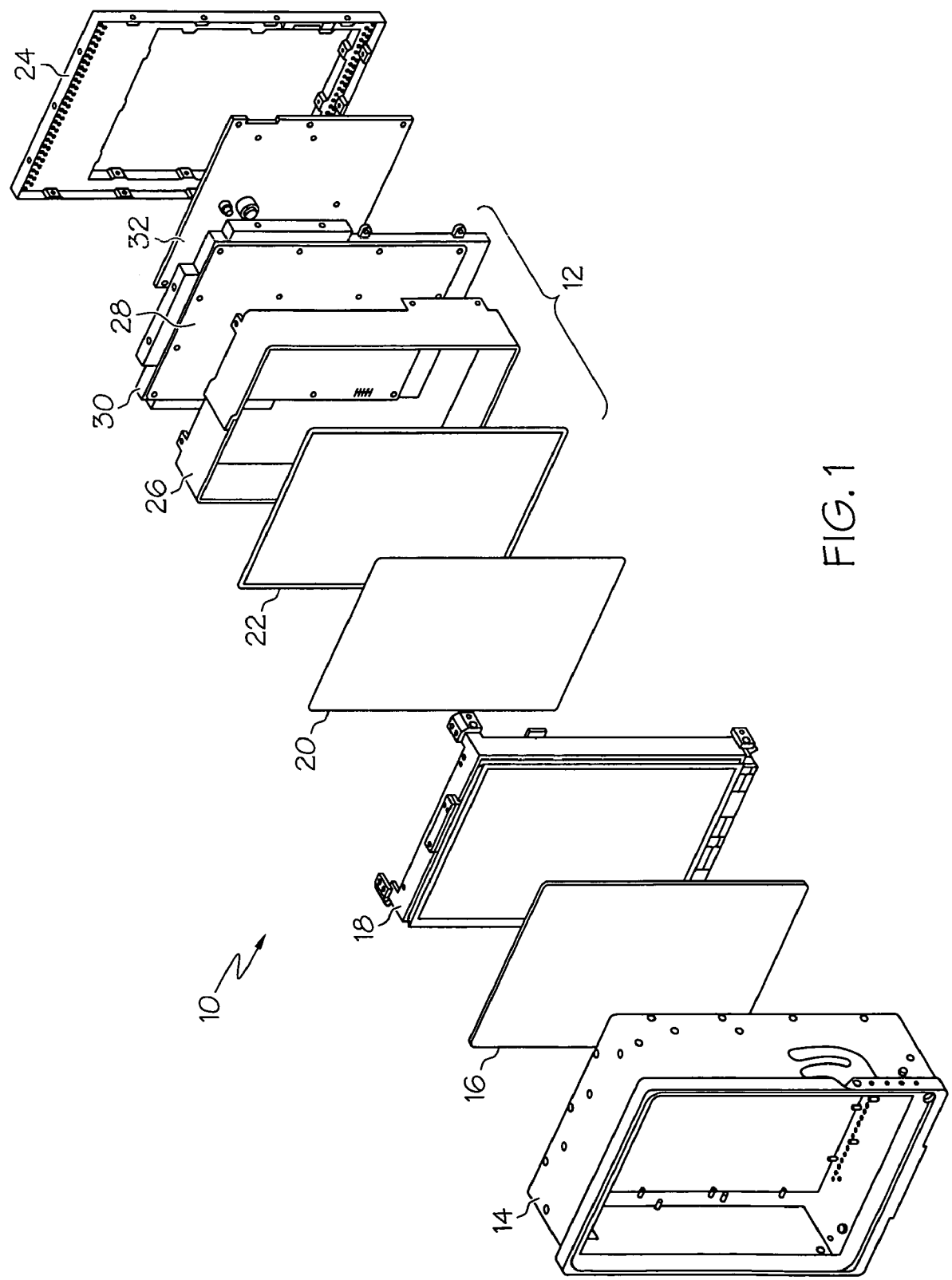
FIGS. 1 and 2 are exploded front and rear views, respectively, of a liquid crystal display (LCD) assembly including highly efficient backlight assembly in accordance with an exemplary embodiment.
Figure 2:
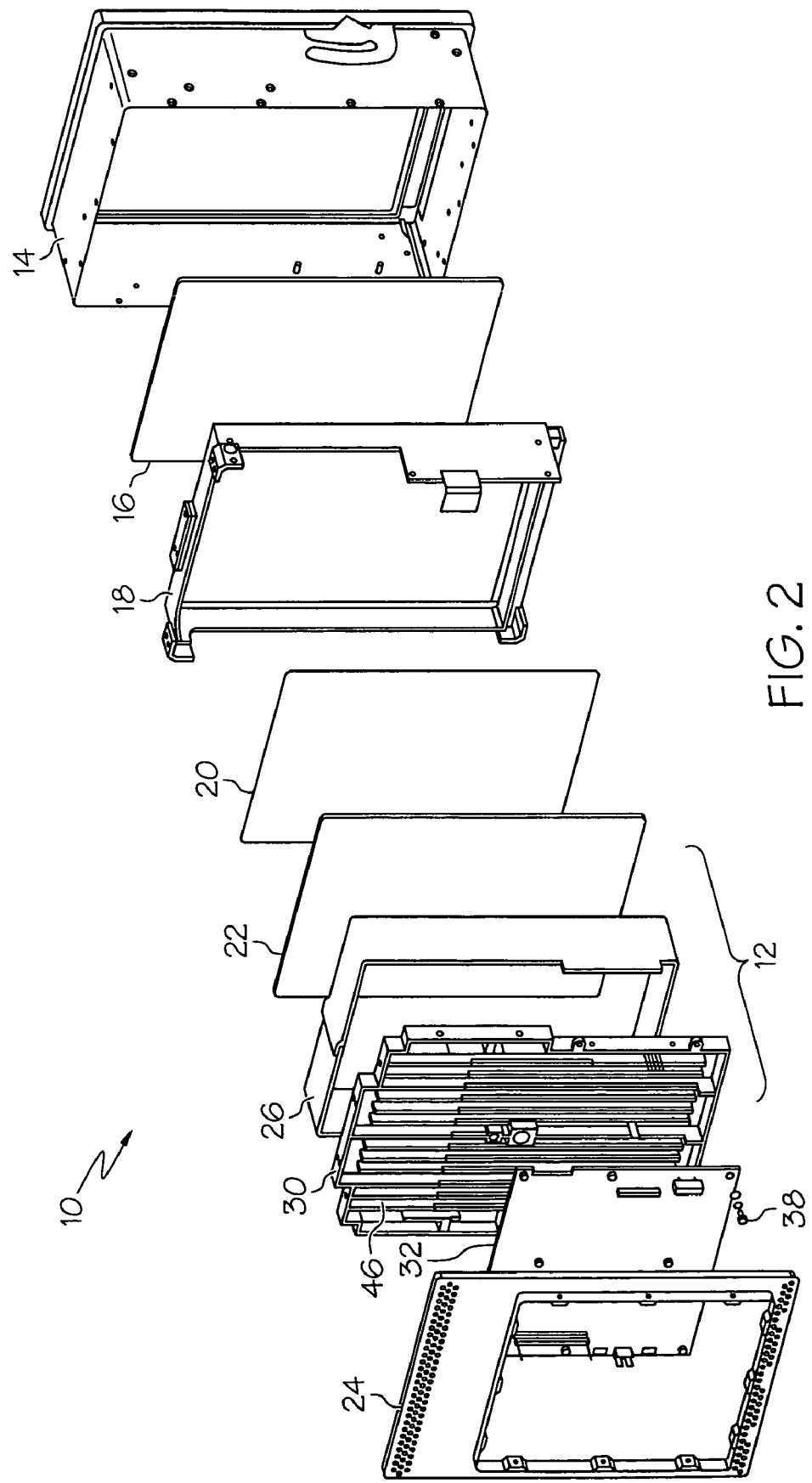

FIGS. 1 and 2 are front and rear exploded views, respectively, of a liquid crystal display (LCD) assembly 10 including a highly efficient backlight assembly 12 in accordance with an exemplary embodiment. Backlight assembly 12 is considered highly efficient in view of its ability to produce relatively bright light while consuming relatively little power. As will be explained more fully below, this efficiency is due, in large part, to formation of a highly reflective light cavity within backlight assembly 12. Considering the efficiency of backlight assembly 12 and, more generally, the efficiency of LCD assembly 10, LCD assembly 10 is well-suited for deployment within the cockpit of an aircraft as, for example, a primary flight display (PFD), a secondary flight deck display (FDD), a Control Display Unit (CDU), an Engine Instrument and Crew Advisory System (EICAS) display, or the like.

In addition to backlight assembly 12, LCD assembly 10 includes a housing 14, a display cover 16 (e.g., a glass pane), a liquid crystal display (LCD) 18, a polarizer film 20, a diffuser film 22, and a back plate 24. Back plate 24 may be fixedly coupled to housing 14 utilizing a plurality of screws or other such fasteners (not shown). When LCD assembly 10 is fully assembled, display cover 16, LCD 18, polarizer film 20, diffuser film 22, and backlight assembly 12 reside within housing 14. As indicated in FIGS. 1 and 2, LCD 18 resides between display cover 16 and polarizer film 20; polarizer film 20 resides between LCD 18 and diffuser film 22; diffuser film 22 resides between polarizer film 20 and backlight assembly 12; and backlight assembly 12 resides between diffuser film 22 and back plate 24. In embodiments wherein LCD assembly 10 is to be deployed onboard an aircraft or utilized within another high vibratory environment, LCD assembly 10 may be ruggedized. LCD assembly 10 may include various other conventionally-known components (e.g., an elastomeric gasket disposed around the circumference of display cover 16) that are not shown in FIGS. 1 and 2 for clarity.

Figure 3:
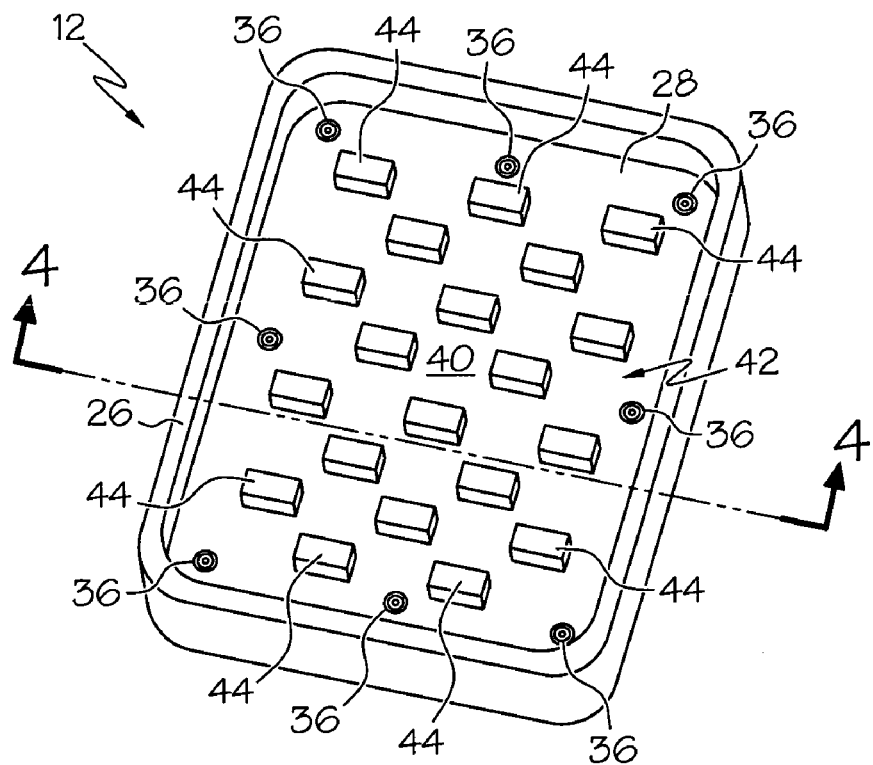
FIG. 3 is a front isometric view of the exemplary backlight assembly shown in FIGS. 1 and 2 including a printed wiring board (PWB) and a casing sidewall.

FIG. 3 is a front isometric view of backlight assembly 12. Referring collectively to FIGS. 1-3, backlight assembly 12 includes a casing sidewall 26, a printed wiring board (PWB) 28 (shown most clearly in FIGS. 1 and 3), a heat sink 30 (shown most clearly in FIG. 2), and a driver board 32 (shown most clearly in FIGS. 1 and 2). PWB 28 may be mounted to the leading face of heat sink 30 utilizing, for example, a plurality of screws 36 (shown in FIG. 3) or other such fasteners. Similarly, driver board 32 may be mounted to the trailing face of heat sink 30 utilizing one or more screws 38 (only one of which is shown in FIG. 2 for clarity) or other fastening means. When backlight assembly 12 is fully assembled, casing sidewall 26 is circumferentially disposed around and generally circumscribes PWB 28 as shown in FIG. 3. The major leading face of PWB 28, referred to herein as "display-facing surface 40" to emphasize its spatial orientation with respect to LCD 18 (or other flat panel display), cooperates with the inner peripheral surfaces of casing sidewall 26 to form a light cavity 42 (identified in FIG. 3). As illustrated in FIG. 3, a plurality of light emitting diodes (LEDs) 44 may be mounted to display-facing surface 40 of PWB 28 and electrically coupled to driver board 32. For clarity, LEDs 44 are illustrated as generic blocks in FIG. 3 having exaggerated dimensions. In the illustrated example, LEDs 44 are spatially distributed in a grid array; however, various other spatial arrangements are also useful.

During operation of LCD assembly 10, driver board 32 (FIGS. 1 and 2) energizes LEDs 44 to illuminate light cavity 42 and provide backlighting for LCD 18. Although LEDs 44 may be configure to emit any desired wavelength or set of wavelengths, it is preferred that LEDs 44 collectively emit light that is substantially evenly distributed over the visible spectrum. In certain embodiments, driver board 32 may be configured to adjust the brightness of the light emitted by LEDs 44 in accordance with user input. Driver board 32 may be included within a closed-loop compensation system configured to adjust the brightness of the LED-produced light, as monitored by a first optical sensor mounted to PWB 28 (not shown), to compensate for the brightness of ambient light, as monitored by a second optical sensor (also not shown). Diffuser film 22 disburses the light produced by LEDs 44 over the rear surface of polarizing film 20. Polarizing film 20 permits the passage of light oriented in the same manner as the polarizing filters of LCD 18 and reflects light that is not oriented in the same manner as the LCD's polarizing filters. Excess heat produced by LEDs 44 is conducted through PWB 28, through the main body of heat sink 30, and into a plurality of projection extending away from the main body of heat sink 30 (commonly referred to as "pin-fins" and identified in FIG. 2 at 46). A cooling source, such as forced airflow, is directed over pin-fins 46 to convectively cool heat sink 30 and thereby dissipate excess heat from backlight assembly 12.

As previously indicated, the efficiency of backlight assembly 12, and specifically the brightness of the light produced by backlight assembly 12 relative to the power required to drive the backlight assembly 12, has a significant impact on the overall efficiency of LCD assembly 10. The efficiency of backlight assembly 12 is determined, in part, by the efficiency with which light cavity 42 reflects light produced by LEDs 44, as well as any light returned by polarizing film 20. It is thus desirable for light cavity 42, and specifically display-facing surface 40 of PWB 28, to reflect light over the visible color spectrum with a high efficiency. Furthermore, in embodiments wherein LCD 18 is a full color display and/or LEDs 44 produce light that is substantially evenly distributed over the visible color spectrum, it is also desirable for light cavity 42 to also reflect light substantially evenly over the visible color spectrum. Therefore, in accordance with embodiments of the present invention, a specialized optical coating is applied over display-facing surface 40 of PWB 28 as described more fully below in conjunction with FIG. 4.

Figure 4:
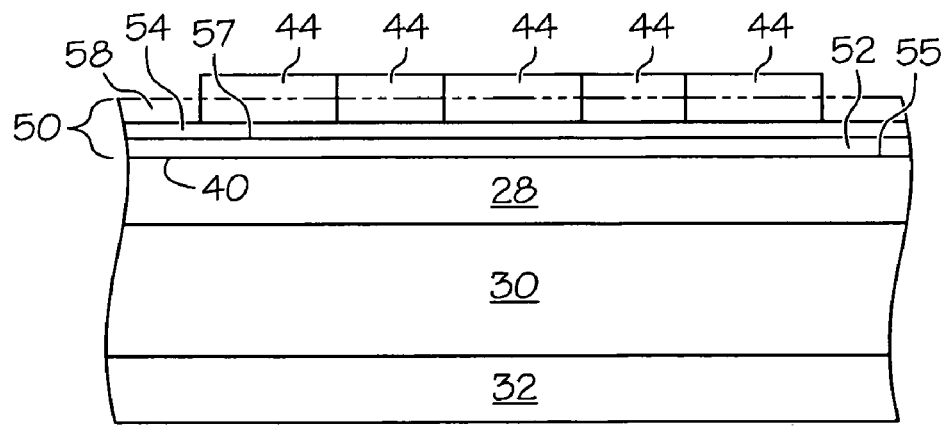
FIG. 4 is a simplified cross-sectional view of the backlight assembly shown in FIGS. 1-3 taken along line 4-4 (labeled in FIG. 3) and illustrating a highly reflective optical coating overlaying the display-facing surface of the PWB.

FIG. 4 is a simplified cross-sectional view of backlight assembly 12 taken along line 3-3 (labeled in FIG. 3) and having casing sidewall 26 hidden from view. FIG. 4 is not drawn to scale. Referring collectively to FIGS. 3 and 4, an optical coating 50 (shown in FIG. 4 only) is disposed over the free area of display-facing surface 40 of PWB 28; i.e., the area of display-facing surface 40 not occupied by LEDs 44 or other components populating PWB 28. In the illustrated example, optical coating 50 includes two primary layers, namely, a reflective solder mask 52 and a first reflective silkscreen layer 54. First reflective silkscreen layer 54 overlays reflective solder mask 52, which, in turn, overlays display-facing surface 40. In a preferred group of embodiments, reflective solder mask 52 assumes the form of a white solder mask that is applied directly onto, and generally covers, display-facing surface 40. Similarly, in a preferred group of embodiments, first reflective silkscreen layer 54 assumes the form of a white silkscreen layer that is applied directly onto, and generally covers, reflective solder mask 52. Stated differently, reflective solder mask 52 includes an inner face 55, which contacts and is substantially contagious with display-facing surface 40 of PWB 28, and an opposing outer face 57, which contacts and is substantially contiguous with first reflective silkscreen layer 54. As indicated in FIG. 4 at 58, one or more additional layers of reflective (e.g., white) silkscreen may be applied over reflective silkscreen layer 54; this notwithstanding, it is generally preferred optical coating 50 includes only a single layer of reflective (e.g., white) silkscreen and, therefore, that reflective silkscreen layer 54 is the terminal or outermost layer of optical coating 50. As appearing herein, the term "reflective solder mask" is utilized to denote a solder mask that reflects an average of at least 90% visible light over the visible spectrum; and the term "reflective silkscreen layer" denotes a layer of material applied utilizing a silk screening technique (described more fully below) and reflecting an average of at least 90% visible light over the visible spectrum.

Figure 5:
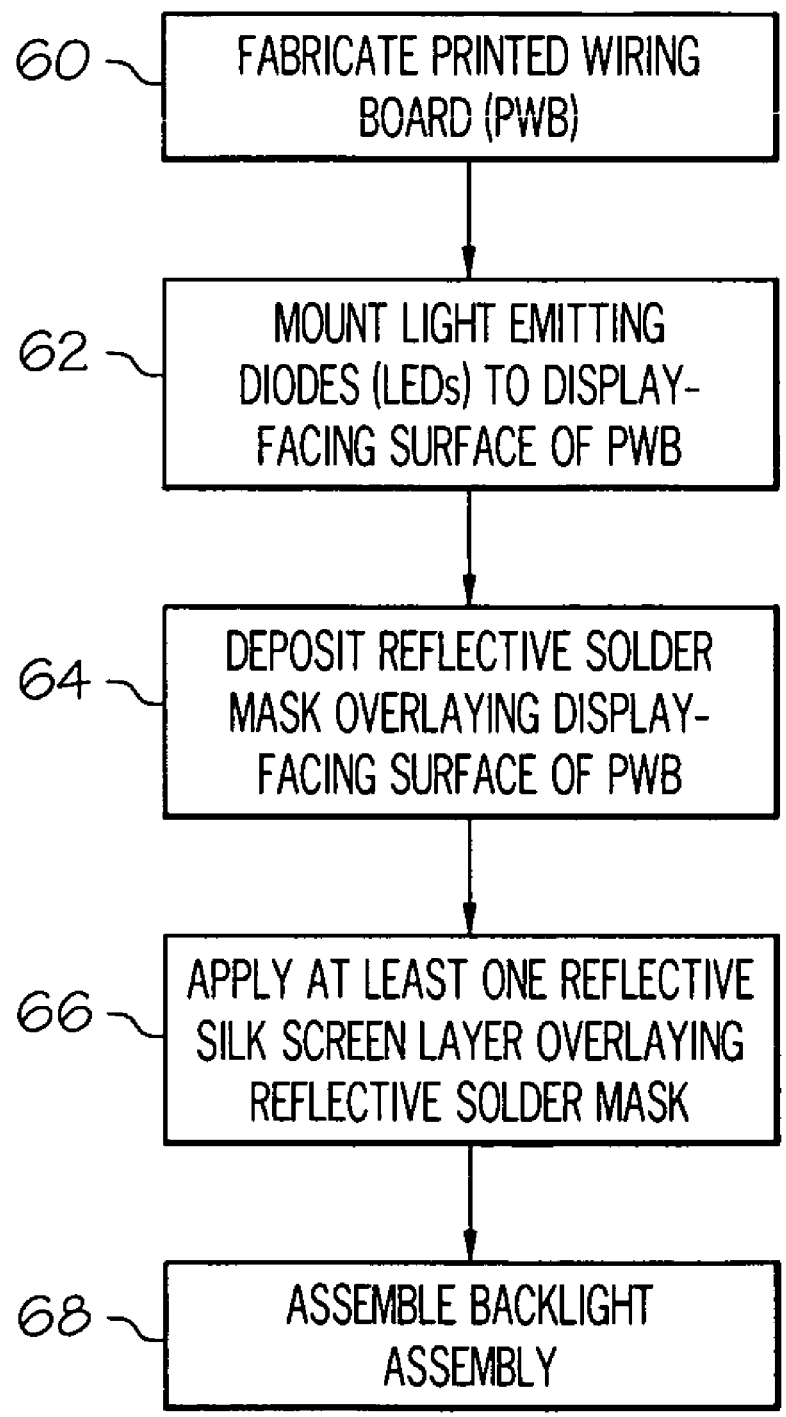
FIG. 5 is a flowchart illustrating an exemplary method for fabricating the highly efficient backlight assembly shown in FIGS. 1-4.

FIG. 5 is a flowchart illustrating an exemplary method suitable for fabricating backlight assembly 12 (FIGS. 1-4). To commence, PWB 28 is produced utilizing conventional manufacturing processes (STEP 60), and LEDs 44 are mounted to display-facing surface 40 of PWB 28 (STEP 62). Next, at STEP 64, reflective solder mask 52 (FIG. 4) is applied over display-facing surface 40 adjacent LEDs 44. Reflective solder mask 52 preferably comprises a white solder mask, as defined above, which is applied directly onto PWB 28 utilizing a silk screening process or other technique conventionally utilized in solder mask deposition. In embodiments wherein a white solder mask is applied, the white solder mask may comprise an epoxy liquid and in which a white powder, such as talc, is dissolved; however, the particular composition of the reflective solder mask will inevitably vary amongst different embodiments of the present invention.

Next, at STEP 66, at least one reflective silkscreen layer is formed over reflective solder mask 52 (FIG. 4). In a preferred embodiment, a first white silkscreen layer 54 (FIG. 4) is be applied directly to solder mask 52 during STEP 66 utilizing a conventional silk screening technique. In one option, a mesh screen is positioned over display-facing surface 40 of PWB 28 along with a mask, which covers LEDs 44 and any other the critical components residing on or exposed through surface 40. Utilizing a specialized squeegee or other tool, white ink is then applied through the mesh screen and onto the areas of display-facing surface 40 of PWB 28 not covered by the mask. In a preferred embodiment, a "no bake" ink is utilized that does not require subsequent curing. If desired, additional layers of reflective silkscreen, such as white silkscreen, may be applied over first white silkscreen layer 54 (again, generically illustrated in FIG. 4 at 58) utilizing a similar process, although it will be appreciated the application of each additional silkscreen layer beyond the base silkscreen layer 54 may require the performance of a thermal cure step or steps. Reflective solder mask 52, white silkscreen layer 54, and any additional white silkscreen layers 58, if provided, cooperate to reflect visible light with high efficiency and in a manner that is substantially evenly over the visible color spectrum.

To complete the exemplary method illustrated in FIG. 5 (STEP 68), backlight assembly 12 is assembled. That is, PWB 28 is mounted to the leading face of heat sink 30 (FIGS. 1-4), driver board 32 (FIGS. 1-4) is mounted to the trailing face of heat sink 30, and electrical interconnections are completed as appropriate. Casing sidewall 26 (FIGS. 1-4) is produced utilizing conventional machining processes and disposed around PWB 28 to form light cavity 42 as generally shown in FIG. 3. In certain embodiments, the inner surfaces of casing sidewall 26 may be coated with a reflective material, such as a polyurethane paint, to further increase the reflectivity of light cavity 42 and help maintain lighting uniformity of backlight assembly 12.

The foregoing has thus provided an exemplary embodiment of a backlight assembly including a highly reflective light cavity that is relatively inexpensive and straightforward to produce. Notably, the highly reflective light cavity included an optical coating overlaying the display-facing surface of the PWB that is highly reflective over the visible color spectrum. In preferred embodiments, the optical coating comprised a white solder mask and at least one white silkscreen layer, which cooperate to reflect light substantially evenly over the visible color spectrum. The foregoing also provided an exemplary method suitable for fabricating such a high efficiency backlight assembly that fits within standard manufacturing processes and can be automated with relative ease. In the above-described exemplary embodiment, the backlight assembly included a plurality of light emitting diodes mounted directly to the display-facing surface of the PWB; this example notwithstanding, the LEDs may be disposed at other locations in the flat panel display assembly in alternative embodiments. For example, in certain embodiments, the LEDs may disposed around the inner circumference of the casing sidewall (e.g., casing sidewall 26 shown in FIGS. 1-3), and the light emitted from the LEDs may be guided utilizing one or more optical fibers or other waveguide means.

Although the foregoing described a preferred exemplary embodiment a backlight assembly including an optical coating formed utilizing a white solder masker and at least one white silkscreen, the foregoing description is offered by way of example only. In alternative embodiments, the optical coating may be formed utilizing a reflective solder mask that is not white and/or a reflective silkscreen layer that is not white. In such embodiments, the reflective solder mask may be white while the reflective silkscreen layer is a non-white color, such as red or blue, to shift the reflectance of the optical coating toward a desired color point. Conversely, and more preferably, the reflective silkscreen layer may be white while the reflective solder mask is red, blue, or other non-white color. In a group of preferred embodiments, one of the reflective silkscreen layer and the reflective solder mask is white, and the other of the reflective silkscreen layer and the reflective solder mask is red or blue.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A backlight assembly for deployment within a flat panel display assembly, the backlight assembly comprising:

a printed wiring board (PWB) having a display-facing surface;

a casing sidewall disposed around a peripheral portion of the PWB and cooperating with the display-facing surface to define a light cavity;

a plurality of light emitting diodes (LEDs) electrically coupled to the PWB and illuminating the light cavity when energized;

a reflective solder mask overlaying the display-facing surface of the PWB; and a first reflective silkscreen layer overlaying the reflective solder mask and comprising a white no bake ink, the first reflective silkscreen layer cooperating with the reflective solder mask to increase the reflectivity of the light cavity over the visible color spectrum.

2. A backlight assembly according to claim 1 wherein the reflective solder mask comprises a white solder mask.

3. A backlight assembly according to claim 2 wherein the white solder mask comprises an inner face and an outer face substantially opposite the inner face, the inner face contacting the display-facing surface of the PWB.

4. A backlight assembly according to claim 3 wherein the outer face contacts and is substantially contiguous with the first white silkscreen layer.

5. A backlight assembly according to claim 4 wherein the plurality of LEDs is mounted to the display-facing surface of the PWB.

6. A backlight assembly according to claim 1 further comprising a second white silkscreen layer disposed over the first white silkscreen layer.

7. A backlight assembly for deployment within a flat panel display assembly, the backlight assembly comprising:

a printed wiring board (PWB) having a display-facing surface;

a casing sidewall disposed around a peripheral portion of the PWB and cooperating with the display-facing surface to define a light cavity;

a plurality of light emitting diodes (LEDs) electrically coupled to the PWB and illuminating the light cavity when energized;

a reflective solder mask overlaying the display-facing surface of the PWB; and a first reflective silkscreen layer overlaying the reflective solder mask, the first reflective silkscreen layer cooperating with the reflective solder mask to increase the reflectivity of the light cavity over the visible color spectrum;

wherein the reflective solder mask is white, and wherein the reflective silkscreen layer is a non-white color selected from the group consisting of red and blue.

8. A backlight assembly for use in conjunction with a liquid crystal display (LCD), the backlight assembly comprising:

a printed wiring board (PWB) having a display-facing surface;

a casing sidewall disposed around a peripheral portion of the PWB and cooperating with the display-facing surface to define a light cavity;

a plurality of LEDs mounted to the display-facing surface and configured to illuminate the light cavity when energized;

a white solder mask overlaying the display-facing surface of the PWB;

a first white silkscreen layer overlaying the reflective solder mask; and a second white silkscreen layer overlaying the first white silkscreen layer, the second white silkscreen layer contacting and substantially contiguous with the first white silkscreen layer, the second white silkscreen layer, the first white silkscreen layer, and the reflective solder mask cooperating to increase the reflectivity of the light cavity over the visible color spectrum.

9. A backlight assembly according to claim 8 wherein the white solder mask contacts and is substantially contiguous with the display-facing surface of the PWB.

10. A backlight assembly according to claim 9 wherein the first white silkscreen layer contacts and is substantially contiguous with the white solder mask.

* * * * *